United States Patent
Micale et al.

[11] Patent Number: 5,814,686
[45] Date of Patent: Sep. 29, 1998

[54] COLORED METALLIC PIGMENTS

[75] Inventors: Fortunato J. Micale, Bethlehem; William G. Jenkins, Plymouth, both of Pa.

[73] Assignee: Silberline Manufacturing Co., Inc., Tamaqua, Pa.

[21] Appl. No.: 431,622

[22] Filed: May 1, 1995

Related U.S. Application Data

[63] Continuation of Ser. No. 322,522, Oct. 14, 1994, abandoned, which is a continuation of Ser. No. 104,613, Aug. 11, 1993, abandoned, which is a continuation of Ser. No. 860,607, Mar. 30, 1992, abandoned, which is a continuation of Ser. No. 409,828, Sep. 20, 1989, abandoned.

[51] Int. Cl.$^6$ ............................... C08K 3/08; B32B 5/16
[52] U.S. Cl. ...................... 523/205; 523/208; 523/457; 523/466; 523/459; 524/439; 524/449; 524/459
[58] Field of Search ..................... 523/205, 208, 523/457, 466, 459; 524/441, 439, 449

[56] References Cited

U.S. PATENT DOCUMENTS

| | | | |
|---|---|---|---|
| 2,071,156 | 2/1937 | Baer | 134/76 |
| 3,026,220 | 3/1962 | Sowards | 148/6.1 |
| 3,451,835 | 6/1969 | Ganter et al. | 106/491 |
| 3,567,607 | 3/1971 | Saunders | 524/441 |
| 3,656,981 | 4/1972 | Beschke et al. | 106/491 |
| 3,843,571 | 10/1974 | Fitzgerald | 260/17 R |
| 3,876,603 | 4/1975 | Makhlouf | 523/210 |
| 3,932,320 | 1/1976 | Camelon et al. | 523/210 |
| 4,158,074 | 6/1979 | Uchyama et al. | 427/214 |
| 4,188,236 | 2/1980 | Robertson et al. | 106/491 |
| 4,328,042 | 5/1982 | Ostertag et al. | 106/308 |
| 4,395,499 | 7/1983 | Rosenski et al. | 523/207 |
| 4,490,499 | 12/1984 | Huybrechts | 524/441 |
| 4,503,136 | 3/1985 | Hara et al. | 430/108 |
| 4,513,075 | 4/1985 | Narusawa et al. | 430/108 |
| 4,581,158 | 4/1986 | Lin | 524/441 |
| 4,595,582 | 6/1986 | Wu et al. | 523/200 |
| 4,665,107 | 5/1987 | Micale | 523/105 |
| 4,725,317 | 2/1988 | Wheeler | 524/441 |
| 4,738,892 | 4/1988 | Canova | 106/491 |
| 4,753,829 | 6/1988 | Panush | 523/171 |
| 4,965,098 | 10/1990 | Handa et al. | 523/216 |
| 4,981,882 | 1/1991 | Smith et al. | 524/457 |
| 5,037,475 | 8/1991 | Chida | 523/205 |
| 5,045,114 | 9/1991 | Bigalk | 524/441 |
| 5,187,220 | 2/1993 | Richart | 524/441 |

FOREIGN PATENT DOCUMENTS

| 85438 | 8/1993 | European Pat. Off. | 524/441 |

*Primary Examiner*—Donald R. Wilson
*Attorney, Agent, or Firm*—Merchant, Gould, Smith, Edell, Welter & Schmidt, P.A.

[57] ABSTRACT

The invention relates to a colored pigment comprising a plurality of metallic or mica flakes with a plurality of polymer encapsulated pigment particles adhered to the individual flakes. The colored pigments are useful for imparting color and metallic luster to surface coatings.

9 Claims, 4 Drawing Sheets

COLORED METALLIC PIGMENTS

This is a continuation of application Ser. No. 08/322,522, filed on Oct. 14, 1994, now abandoned which is a continuation application of Ser. No. 08/104,613, filed on Aug. 11, 1993, now abandoned which is a continuation of Ser. No. 07/860,607, filed Mar. 30, 1992, now abandoned which is a continuation of Ser. No. 07/409,828, filed Sep. 20, 1989, now abandoned.

BACKGROUND OF THE INVENTION

1. Field of the Invention

This invention relates generally to the field of metallic pigments, and more particularly, relates to a process for preparing a colored metallic pigment suitable for use as a surface coating and to the colored metallic pigment product.

2. Discussion of the Prior Art

Metallic pigments in general, and aluminum pigments in particular are widely used in the coating industry to produce finishes of the type which have a metallic luster. The procedure generally used at the present time to produce a colored finish with a metallic luster is to disperse both a metallic pigment and a transparent colored pigment in a suitable vehicle. Such dispersions have achieved wide acceptance as automotive finishes wherein a plurality of interesting colors having a metallic luster have become increasingly popular.

In the past, attempts at coloring aluminum flake pigments have been tried by prior workers in the art, using a precipitation of iron oxide onto the aluminum pigment surface. This has produced a flake with a gold color, but the procedure has been rather complicated. Another process for coloring metallic pigments is disclosed in U.S. Pat. No. 4,328,042 which teaches the vapor deposition of iron penta-carbonyl onto an aluminum flake surface. The subsequent oxidation of the iron penta-carbonyl to iron oxides and carbon dioxide then produces a colored flake. The color of this flake is dependent on the conditions of processing and thickness of the iron oxide layer. In U.S. Pat. No. 4,158,074, a process for coloring aluminum powder is disclosed which comprises immersing finely divided aluminum in a weak alkali solution containing a specified metallic salt and an aliphatic amine and then separating the aluminum from the solution. The need remains to provide a commercially acceptable procedure for economically coloring metallic pigments.

It is therefore an object of the present invention to provide a process for the preparation of colored metallic pigments, particularly aluminum pigments, wherein a surface coating can be produced having the desired metallic luster without requiring the additional dispersion of a transparent colored pigment.

It is a further object of this invention to provide a process to reproducibly and irreversibly color specific grades of aluminum flake pigments.

SUMMARY OF THE INVENTION

This invention relates to colored metallic pigments suitable for use as surface coatings, and more particularly, teaches how to make metallic particles having a color imparted thereto and wherein the desired metallic luster has been retained.

An experimental approach has been adopted for coloring metallic particles, such as aluminum flakes, with pigment particles encapsulated with polymers and copolymers which is cured thereon. Such encapsulated submicron-sized pigment particles are of the type described and claimed in U.S. Pat. No. 4,665,107 entitled "Pigment Encapsulated Latex Aqueous Colorant Dispersions". Such particles are hereinafter referred to a "PEL" colorants and can be obtained from Koh-I-Noor Rapidograph, Inc., Bloomsburg, N.J. The advantage of this approach is that the encapsulating polymer matrix can be designed specifically to interact directly with the metallic flake surface and result in good adhesion independent of the nature of the pigment particle.

The stability of colloidal dispersions, where all the dispersed particles are identical, may be brought about by coulombic repulsion where all the particles have the same ionic charge and hence are repelled by one another. Instability can occur when the particles have a very low charge or are oppositely charged. Selective interaction between two different types of dispersed particles require that the like particles are stable with respect to one another, so as to prevent flocculation, but that one type of particle will be unstable with another type. It is also expected from the theory of van der Waals attraction, which is a basic attraction which exists between all matter, that the attraction between a particle with a small radius of curvature, i.e., a colored pigment particle, and a flat particle, i.e., a metallic flake, will be greater than the attraction between two small particles. The theory suggests that it is possible for both the colored pigment and the metallic pigment to have the same ionic charge, but that the charge on the colored pigment can be controlled so as to have a charge which is sufficiently high for stability between colored pigments but low enough so as to be unstable with aluminum flakes.

This concept has been tested by measuring the electrophoretic mobility, which is a measure of the sign and magnitude of particle charge, of aluminum powder, 3A yellow PEL, and yellow pigment in water as a function of pH. The yellow pigment and the encapsulated pigment utilized in the PEL were Ciba Geigy YT-915-D Monastral Yellow. This experiment was carried out in water because the sign and magnitude of particle charge could be more conveniently controlled by pH. The results of these experiments show that all the particles are negative as a function of pH except for the aluminum which turned positive at pH values below 3. The yellow PEL and pigment were subsequently individually added to aluminum dispersions in water at the different pH values. The results were evaluated by observing the supernatant after sedimentation of the aluminum particles. A clear and colored supernatant were interpreted as effective and ineffective coloring respectively of the aluminum pigment.

The results showed that coloring of the aluminum particles occurred at a pH value of 2 for both PEL and yellow pigment where the aluminum was positive and the yellow PEL and pigment were negatively charged. Limited coloring was detected for the yellow pigment at pH of 4 where both the aluminum and the yellow pigment had a negative charge, but with a low value for the yellow pigment. Subsequent increases in pH for the colored aluminum pigment dispersions showed that the PEL remained with the aluminum particles while the yellow pigment slowly redispersed with modest agitation. These experiments indicated that initial coloring of aluminum pigments can be controlled by surface charge, but that irreversibility of coloring requires additional adhesion brought about by the encapsulating polymer which may necessitate formulation for specific grades of aluminum pigments.

According to one embodiment of the invention there is provided a colored metallic pigment comprising the combination of metallic flakes and a polymer matrix encapsulating a solid colorant cured thereon.

Advantageously, the polymer and colorant comprise about 4% to 25% by weight of said combination.

Preferably, the amount of polymer to colorant is in a ratio of 10% polymer to 90% colorant to 90% polymer to 10% colorant.

Metallic flake material other than aluminum can be used, for example, zinc, brass, bronze, gold and the like.

The polymer matrix is formed preferably with a polymer selected from the group consisting of polyvinyl butyral resin, vinyl acetal polymers, butyrals, bisphenol glycidyl ether type epoxy resin, rosin maleic copolymer resin, carboxyl functional acrylics, styrene/maleic anhydride copolymers and alkylated vinylpyrrolidone copolymers.

According to a further embodiment of the invention a coating composition is formed with the colored metallic pigment and suitable organic solvent. Preferably, the solvent comprises mineral spirits.

The invention also provides a method for preparing a colored metallic pigment comprising the steps of A. Admixing metallic flakes in a lower alcohol, B. Adding to the mixture of step A a colorant encapsulated in a polymeric matrix.

Preferably, the metallic flakes in said lower alcohol are at a concentration of less than 5%. Advantageously, the content of water is not more than 5%.

DESCRIPTION OF THE PREFERRED EMBODIMENT OF THE INVENTION

The experimental conditions required for coloring metallic pigments with PEL must take into account three facts. One is that the PEL can only, in the practical sense, be supplied as aqueous dispersions. Another fact is that metallic pigments, such as aluminum pigments, are normally supplied as a paste in mineral spirits and must undergo minimum contact with water. The final fact is that water is only slightly soluble in mineral spirits. These facts require that the coloring procedure utilize an intermediate solvent which is mutually soluble in both water and mineral spirits since the presence of a second liquid phase will not permit direct interaction between the coloring particle and the metallic pigment. The general concept is that as the polarity of a molecule decreases, the solubility in water decreases and the solubility in mineral spirits increases. Alcohols of different chain length were evaluated as the intermediate solvent because of the wide range and systematic availability of the polarity of the alcohol series as a function of chain length, and because alcohols, in general, are economically available and are relatively safe in terms of environmental considerations.

The general laboratory procedure for coloring aluminum pigment was as follows. A known amount of commercial grade aluminum pigment, for example, Sparkle Silver® 3000 AR Aluminum Paste, as manufactured and sold by Silberline Manufacturing Co., Inc., Hometown, Pa., the assignee of the present application, was added to 10 cc of alcohol in a test tube and shaken for about 30 seconds. A known amount of a 10% dispersion of PEL in water was then added to the aluminum pigment dispersion in alcohol and shaken intermittently for several minutes. The test tube was then allowed to stand for approximately two hours to allow total sedimentation of the aluminum pigment. The clarity of the supernatant was then recorded along with the sedimentation height of the aluminum pigment. The sedimentation height is indicative of the packing density of the aluminum pigment which is a function of the degree of interaction between the aluminum particles. A clear supernatant indicated that either the PEL has colored the aluminum flakes and settled with the larger aluminum particles, or that the PEL particles have flocculated and settled as a result of the particle size of the flocculates. A colored supernatant, which can exhibit different degrees of color, indicated that the PEL particles were undergoing limited or no interaction with the aluminum flakes. The clarity of the supernatant was generally identified according to the three designations of clear, "C", partly clear, "PC", and unclear "UC".

A series of experiments were typically conducted following the coloring step for the purpose of determining the irreversibility of the colored aluminum pigments in different solvents. The first experiment, which was necessary to remove most of the water in the system, was to decant the supernatant and to replace the supernatant with the pure solvent used in the coloring step. The aluminum pigment was again allowed to settle and observations were made concerning the clarity of the supernatant and the sedimentation height. This procedure was then repeated for mineral spirits, and for additional solvents such as n-butanol and toluene. The degree of coloring of the aluminum pigment was evaluated by making wire wound drawdowns on mylar film of the aluminum paste prepared in mineral spirits. The solvents employed preferably are low, water miscible alcohols, such as, for example, methanol, ethanol, propanol, isopropanol, 1-butanol and 2-butanol.

EXAMPLE 1

The initial experiments for the coloring of aluminum paste were carried out with the Sparkle Silver 3000 AR Aluminum Paste in the solvent n-butanol. N-butanol was employed inasmuch as it has a limited solubility for water of 10%, and is miscible with mineral spirits. The aluminum paste was first dispersed in the butanol and a yellow PEL, 3A, was subsequently added to the butanol and stirred for several minutes. Observation of the supernatant after sedimentation indicated that the aluminum particles were colored. The colored aluminum was then transferred to mineral spirits and drawdowns revealed that the aluminum particles were irreversibly colored with the yellow PEL under these conditions. The same treatment with the yellow pigment did not result in coloring of the aluminum pigment. Identical tests were run for a blue PEL with the same results.

EXAMPLE 2

A number of experiments were carried out to define the conditions necessary for coloring Sparkle Silver 3000 AR Aluminum Paste in n-butanol with the PEL dispersions. It was found that the degree of coloring the aluminum pigment was controlled primarily by the concentration of water in the butanol. Very little coloring was found to occur when the water concentration in the butanol exceeded 5%. One factor which had a pronounced effect on the degree of coloring of the aluminum pigment was the instability, i.e., the flocculation, of the PEL dispersions in butanol at the higher water concentrations. Since the PEL colorants are aqueous dispersions of about 10% solids, the aluminum pigment concentration in butanol had to be maintained below 5% in order to obtain good color value with a sufficient amount of PEL particles. The concentration of water in preparing the colored pigment can be controlled by evaporating water from the PEL formulation so that the PEL is increased in solids concentration. Water can be directly added to the aluminum, PEL-alcohol slurry.

EXAMPLE 3

A series of different solvents, such as 2-butanol, tert-butanol, iso-propanol, n-propanol, and ethanol were evaluated as the intermediate coloring solvent. The objective was to evaluate the different solvents for efficient coloring at higher aluminum paste concentrations. The propanols were chosen as the primary solvents because they are good solvents for both water and mineral spirits, and, at least qualitatively, yielded the most consistent results in terms of color intensity. A systematic series of coloring experiments were carried out with n-propanol and isopropanol as the intermediate coloring solvent for a variety of PEL formulations as supplied by Koh-I-Noor, Rapidograph, Inc.

EXAMPLE 4

A blue and yellow PEL (5A) was used to color Sparkle Silver 3000 AR Aluminum Paste at different color levels in the range of 4% to 25% PEL solids based on aluminum paste in n-propanol at an aluminum paste concentration of 5%. The color aluminum paste was subsequently transferred to mineral spirits and drawdowns of the resulting aluminum paste on mylar film was used to determine the relative color value. It was found that the color value increased with increasing PEL concentration up to 15% and leveled off at higher concentrations. Additional experiments in isopropanol with Silberline Manufacturing Co., Inc. Sparkle Silver 3000 AR Aluminum Paste and Tufflake™ 3645 Aluminum Paste for different PEL formulations as a function of the PEL concentration showed that greater color intensity could be obtained by increasing the PEL concentration above 25%, but that the degree of flocculation of the PEL tended to increase with increasing solids. This latter fact could present problems for the stability of the colored aluminum pigment.

Figure 1:
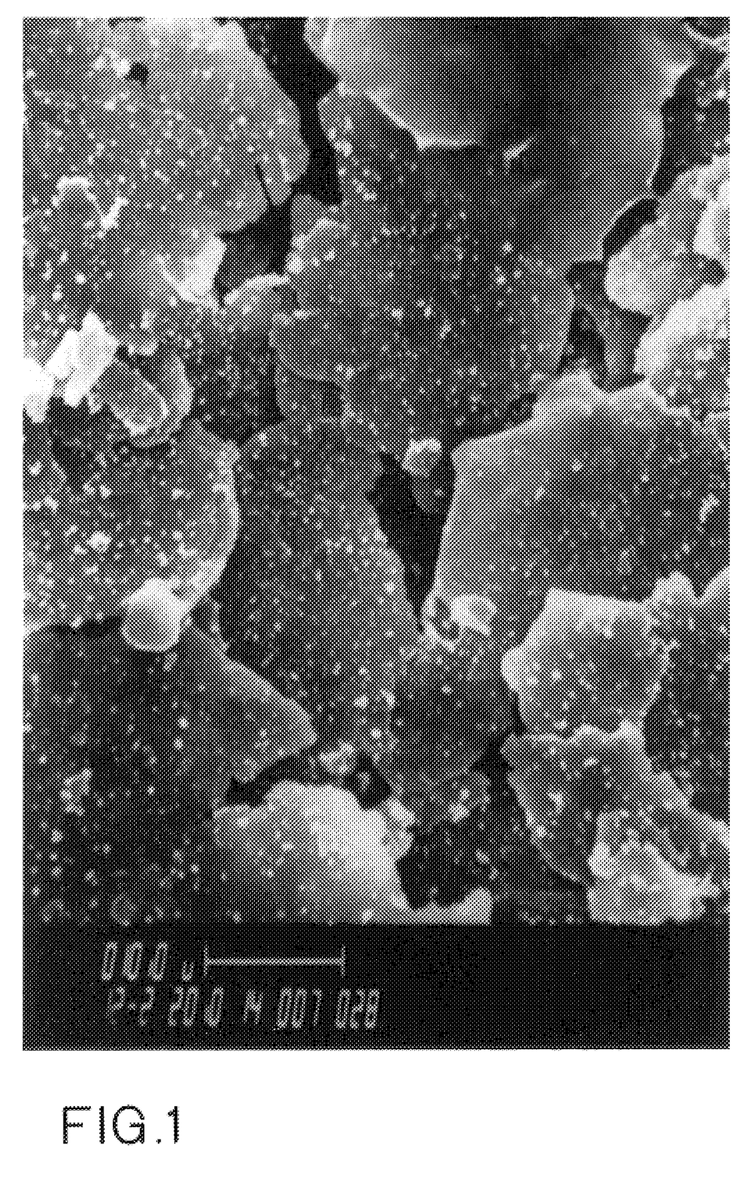
FIG. 1 is a Scanning Electron Micrograph (SEM) at low magnification of a colored aluminum paste with 4 wt.% PEL.
Figure 2:
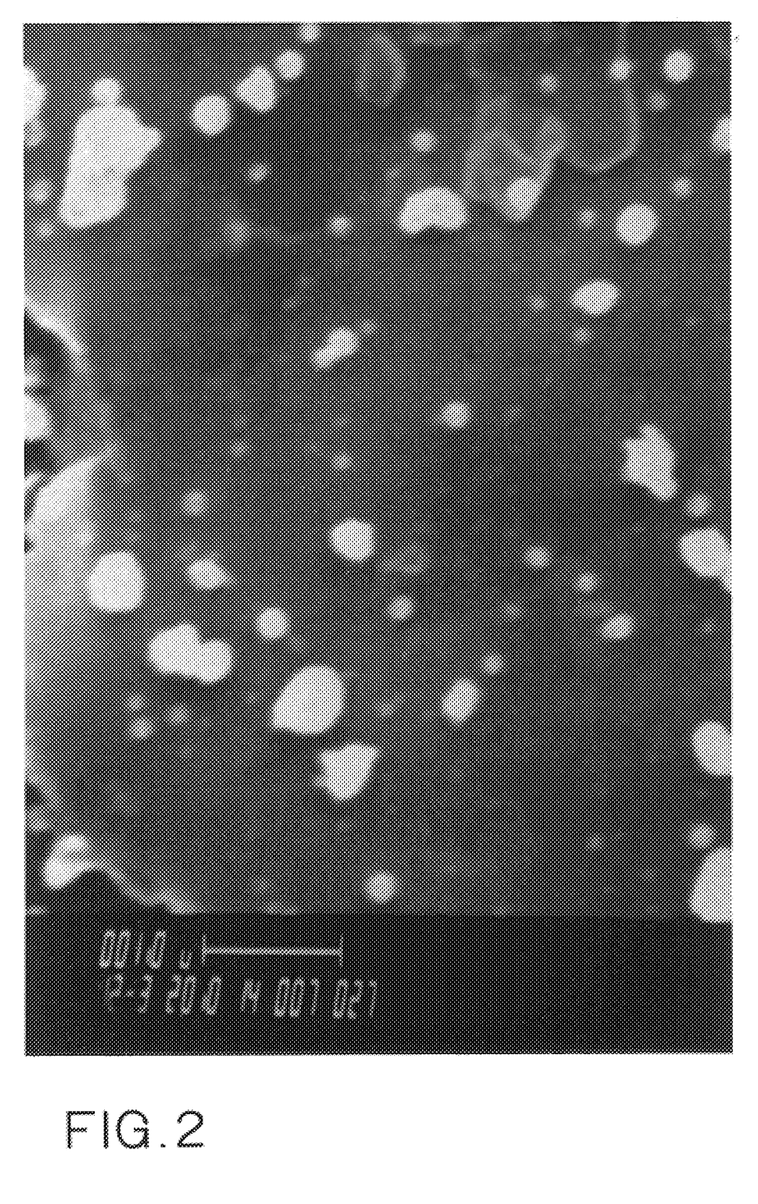
FIG. 2 is an SEM at high magnification of a colored aluminum paste with 4 wt.% PEL.
Figure 3:
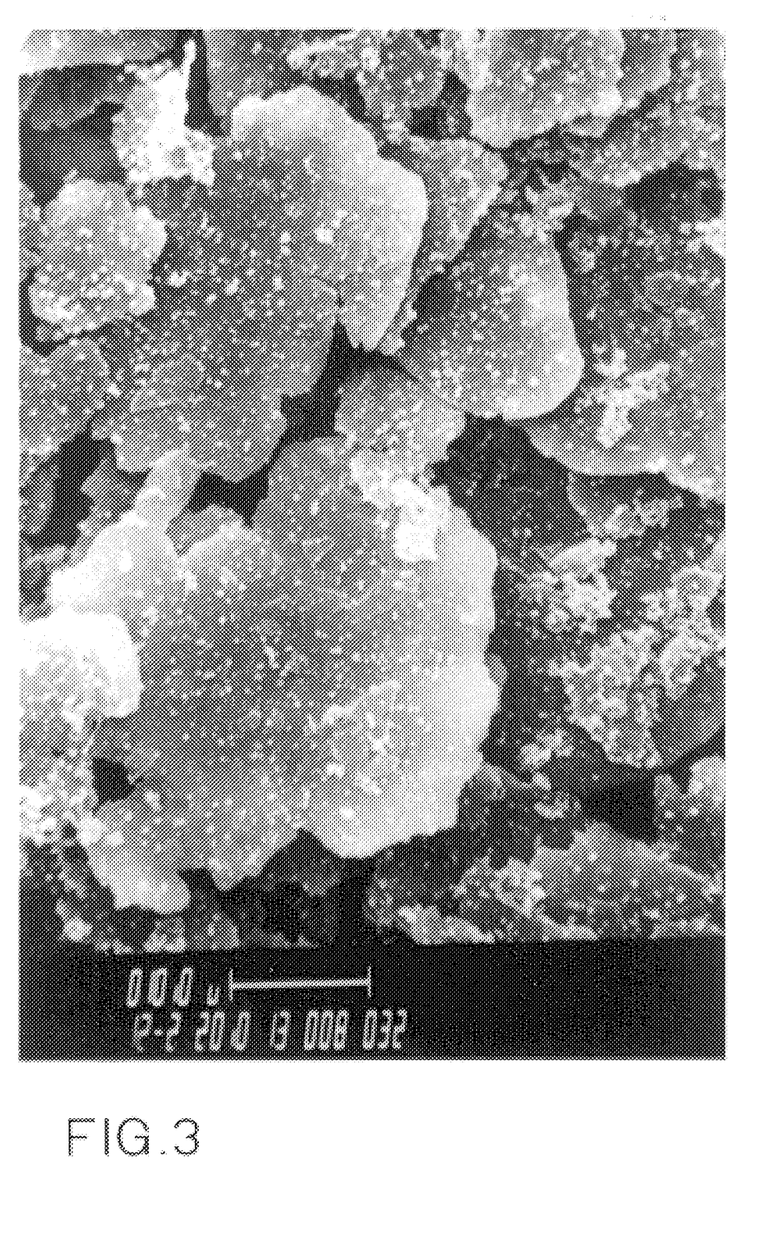
FIG. 3 is an SEM at low magnification of a colored aluminum paste with 25 wt.% PEL.
Figure 4:
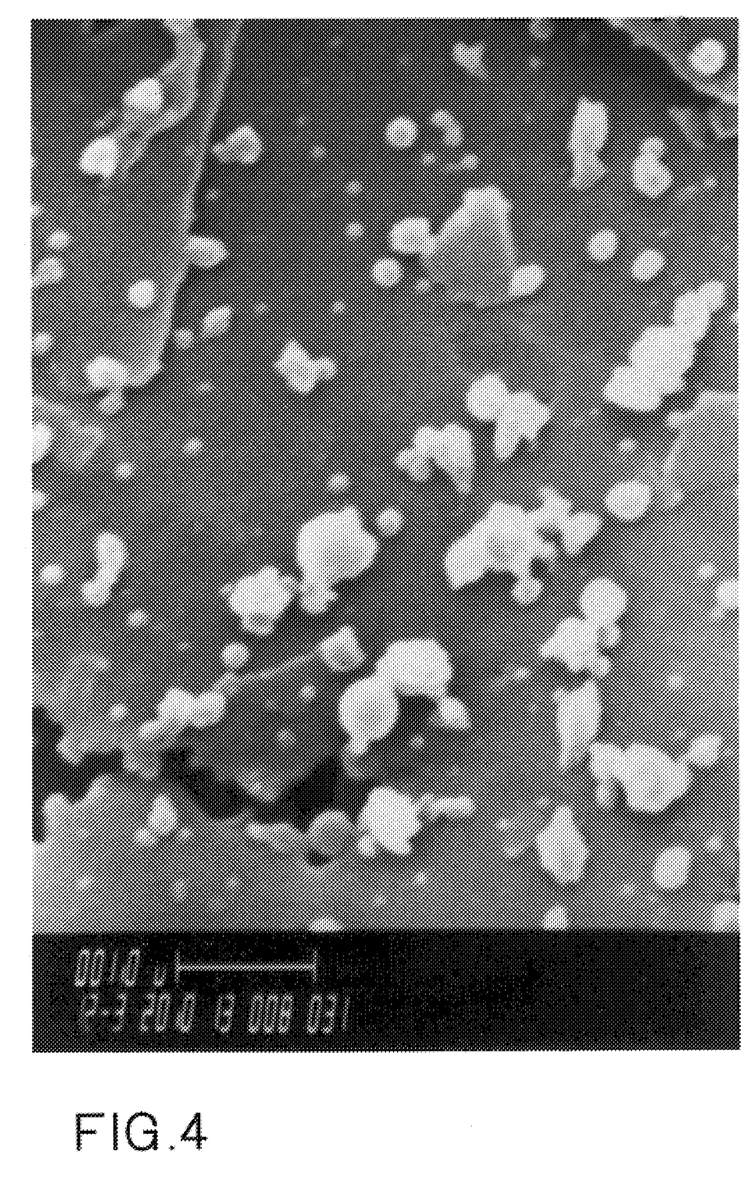
FIG. 4 is an SEM at high magnification of a colored aluminum paste with 25 wt.% PEL.

Scanning electron micrographs, SEM, were taken of the colored aluminum paste at PEL concentrations of 4% and 25%. Representative SEM results at high and low magnification for the high and low color levels are presented in FIGS. 1, 2, 3 and 4. The results show that the PEL is definitely attached to the aluminum flakes under conditions of coloring in n-propanol and subsequent transfer to mineral spirits. The results also indicate that a saturation concentration of PEL on the surface of the aluminum occurs which can be expected to be a function of the stability of the PEL dispersion at the time of coloring. The indication is that the degree of coloring is related to the surface charge of the PEL and aluminum, and that the degree of irreversibility of the PEL on aluminum is related to the properties of polymer present in the PEL formulation.

EXAMPLE 5

The conditions for coloring aluminum paste were evaluated for different experimental versions of PEL, and specifically for coloring Sparkle Silver 3000 AR and Tufflake 3645 Aluminum Pastes. The procedure adopted for evaluating the degree of coloring and the reversibility of the coloring was as follows. The standard formulation was to disperse 0.5 g of aluminum paste in 10 cc of either n-propanol or isopropanol, and to add to the slurry 0.5 cc of PEL dispersions consisting of 6% to 10% solids. The mixture was then shaken in a test tube for one to two minutes and the aluminum flakes were allowed to settle. The turbidity of the supernatant and the sedimentation height of the aluminum was recorded. The supernatant was subsequently removed with a pipette and 10 cc of fresh propanol was added followed by shaking and sedimentation. The sedimentation height and turbidity of the supernatant were recorded followed by removal of the supernatant and the addition of 10 cc of mineral spirits. A few drops of the resulting sediment were then placed on mylar film, the color value was observed, and the sedimentation height and turbidity of the supernatant were recorded. The color stability of the aluminum pigment was then evaluated in n-butanol and in some cases in toluene. Deviations from this standard procedure included variation of the concentration of aluminum paste and the PEL dispersion, and addition of different additives to the propanol during the first coloring step.

The results of the coloring tests are presented in Tables II-1, II-2 and II-3. The PEL used in these tests are presented in Table I. All of the results in Table II were carried out in a test tube with 10 cc of solvent. The columns in the Table II series are identified as follows. The first column identifies the grade and weight of aluminum paste. The second column identifies the grade and weight of PEL dispersion. The third column, which is headed by identification of the coloring solvent, identifies the sedimentation height in brackets and specifies the clarity of the supernatant, i.e., C-clear, PC-partly clear, and UC-unclear. This column also includes any additives used in the coloring step. The remaining columns, which are headed by identification of the rinse solvents, specify the sedimentation height and the clarity of the supernatant.

The results in Tables II-1, II-2 and II-3 summarize the coloring experiments which were carried out under different conditions with different PEL formulations for the Sparkle Silver 3000 AR and Tufflake 3645 Aluminum Pastes dispersed in n-propanol and isopropanol. The results in Table II are intended as a record for the evaluation of the different PEL dispersions and the experimental development for refining the conditions necessary for irreversible coloring of aluminum pigment. Certain trends, however, were observed which led to additional experiments. The variables which were found to be important were the concentration and ratio of PEL to aluminum paste, and the concentrations of water and oleic acid dissolved in the propanol. The results in Table II, including the degree of coloring the drawdowns, also show that the different PEL formulations, which consists of different polymer combinations as the encapsulating material, color and irreversibly color both the Sparkle Silver 3000 AR and Tufflake 3645 aluminum pigments to different degrees. The results confirm that the Sparkle Silver 3000 AR and Tufflake 3645 aluminum pigments exhibit different surface properties, and have different sensitivities to the concentration of water and oleic acid in the propanol.

TABLE I

PEL IDENTIFICATION

| PEL | Preparation Date | PIGMENT |
|---|---|---|
| 3AXL27 Orange | 10/02/87 | Ciba Geigy Irgazin Orange 5R |
| 3AXL272XS Yellow | 9/17/87 | Ciba Geigy Monastral Gold YT-915-D |
| BEC-4 Yellow | 12/14/87 | " |
| BEC-2 Yellow | 1/18/88 | " |
| BEC U1-2 Yellow | 1/28/88 | " |
| BEC U1-4 Yellow | 1/28/88 | " |
| SEB 1-4 Yellow | 2/15/88 | " |
| SEB 1-3 Yellow | 2/26/88 | " |
| BEC-6 Yellow | 3/03/88 | " |
| BEC-31 Yellow | 3/17/88 | " |
| ES2-3 Yellow | 4/15/88 | " |
| BEC U1-4 Blue | 1/22/88 | Sun Chemical Sunfast Blue 249-1284 |
| BEC U2-4 Blue | 1/28/88 | " |
| SEB 1-4 Blue | 2/12/88 | " |
| SEB 1-2 Blue | 2/12/88 | " |
| SEB 1-3 Blue | 2/26/88 | " |
| ES 2-3 Blue | 3/17/88 | " |
| S 1-3 Blue | 3/17/88 | " |
| ES2-31 Red | 5/26/88 | Hoechst/Celanese Hostaperm Red E5B-02 13-7012 |
| ES2-3 Red | 6/08/88 | Hoechst/Celanese Hostaperm Red E5B-02 13-7012 |
| PCA 1815 Gold | 10/06/87 | Ciba Geigy Monastral Gold YT-815-D |
| PCA 2815 Gold | 10/06/87 | " |
| PCA 3815 Gold | 10/06/87 | " |
| PCA 4815 Gold | 10/06/87 | " |
| PCA 35R Orange | 10/12/87 | Ciba Geigy Irgazin Orange 5R |
| PCA 45R Orange | 10/12/87 | " |
| 87-010-03 | 10/14/87 | Ciba Geigy Monastral Gold YT-815-D |

TABLE II

Coloring of Aluminum Paste

| DATE MADE | PASTE | COLORING | N-PROPANOL | RINSE WITH PROPANOL | MINERAL SPIRIT | RINSE WITH BUTANOL |
|---|---|---|---|---|---|---|
| 1 10/5/87 | 3000 0.1 g | 3AXL27 Orange 0.1 g | C (1.5) | C (1.5) | C (1.2) | C (1.2) |
| 2 10/5/87 | 3645 0.1 g | 3AXL27 Orange 0.1 g | C (0.7) | C (0.7) | C (0.6) | C (0.6) |
| 3 10/5/87 | 3000 0.5 g | 3AXL27 Orange 0.25 g | C (3.8) | C (2.8) | C (2.3) | C (2.1) |
| 4 10/5/87 | 3645 0.5 g | 3AXL27 Orange 0.25 g | C (1.6) | C (1.3) | C (1.3) | C (1.3) |
| 5 10/7/87 | 3000 0.5 g | 3AXL27 Orange 0.5 g | 1% Oleic Acid PC (3.4) | C (4.5) | C (3.0) | C (2.6) |
| 6 10/7/87 | 3645 0.5 g | 3AXL27 Orange 0.5 g | 1% Olec Acid UC (1.4) | PC (1.4) | C (1.2) | C (1.2) |
| 7 10/8/87 | 3000 0.5 g | 3AXL27 Orange 0.5 g | 0.1% Oleic Acid PC (3.2) | C (3.5) | C (3.0) | C (3.0) |
| 8 10/8/87 | 3645 0.5 g | 3AXL27 Orange 0.5 g | 0.1% Oleic Acid UC (1.7) | C (1.4) | C (1.2) | C (1.2) |
| 9 9/24/87 | 3000 0.5 g | 3AXL272XS Yellow 0.5 g | C (3.4) | C (3.5) | C (2.9) | C (2.4) |
| 10 9/24/87 | 3645 0.5 g | 3AXL272XS Yellow 0.5 g | PC (1.5) | C (1.3) | PC (1.3) | C (1.2) |
| 11 | 3000 | 3AXL27 | C | C | C | C |

TABLE II-continued

Coloring of Aluminum Paste

| DATE MADE | PASTE | COLORING | N-PROPANOL | RINSE WITH PROPANOL | MINERAL SPIRIT | RINSE WITH BUTANOL |
|---|---|---|---|---|---|---|
| 10/9/87 | 0.5 g | Orange 0.25 g | (5.0) | (3.0) | (2.5) | (2.4) |
| 12 10/9/87 | 3645 0.5 G | 3AXL27 Orange 0.25 g | C (2.4) | C (1.8) | C (1.7) | C (1.7) |
| 13 10/9/87 | 3000 1.0 g | 3AXL27 Orange 1.0 g | UC (6.5) | C (6.9) | C (6.3) | C (5.5) |
| 14 10/9/87 | 3645 1.0 g | 3AXL27 Orange 1.0 g | UC (2.8) | C (2.8) | C (2.5) | C (2.1) |
| 15 10/12/87 | 3645 0.5 g | 3AXL27 Orange 0.1 Color 0.9 DDI | PC (1.0) | C (1.0) | C (1.1) | C (1.1) |
| 16 10/12/87 | 3000 0.5 g | 3AXL27 Orange 0.5 Color 0.5 DDI | PC (5.0) | C (4.7) | C (3.8) | C (4.2) |
| 17 10/12/87 | 3645 0.5 g | 3AXL27 Orange 0.5 Color 0.5 DDI | PC (1.8) | C (1.7) | C (1.7) | C (1.6) |
| 18 10/13/87 | 3000 0.5 g | 3AXL27 Orange 0.25 Color 0.75 DDI | C (4.5) | C (4.2) | C (3.5) | C (3.4) |
| 19 10/13/87 | 3645 0.5 g | 3AXL27 Orange 0.25 Color 0.75 DDI | PC (1.6) | C (1.5) | C (1.5) | C (1.3) |
| 20 10/14/87 | 3000 1.0 g | 3AXL27 Orange 1.0 g | UC (6.7) | C (7.5) | C (6.2) | C (7.1) |
| 21 10/14/91 | 3645 1.0 g | 3AXL27 Orange 1.0 g | PC (3.0) | C (2.9) | C (2.7) | C (2.7) |
| 22 10/14/91 | 3000 2.0 g | 3AXL27 Orange 1.0 g | UC (7.4) | C (8.0) | C (7.5) | C (9.0) |
| 23 10/14/91 | 3645 2.0 g | 3AXL27 Orange 1.0 g | PC (4.4) | C (4.0) | C (3.6) | c (3.6) |
| 24 10/15/87 | 3000 0.5 g | 3AXL27 Orange 0.5 Color 0.5 DDI | 0.1% Oleic Acid PC (4.1) | C (4.8) | C (4.3) | C (3.9) |
| 25 10/15/87 | 3645 0.5 g | 3AXL27 Orange 0.5 Color 0.5 DDI | 0.1% Oleic Acid PC (1.8) | C (1.8) | C (1.8) | C (1.6) |
| 26 10/15/87 | 3000 0.5 g | 3AXL27 Orange 0.25 Color 0.75 DDI | 0.1% Oleic Acid PC (3.5) | C (4.0) | C (3.4) | C (3.1) |
| 27 10/15/87 | 3645 0.5 g | 3AXL27 Orange 0.25 Color 0.75 DDI | 0.1% Oleic Acid PC (1.7) | C (1.6) | C (1.5) | C (1.3) |
| 28 10/16/87 | 3645 1.0 g | PCA1815 Gold (1:1) 1.0 g | C (2.9) | C (2.4) | C (2.5) | C (2.5) |
| 29 10/16/87 | 3645 1.0 g | PCA2815 Gold (2:1) 1.0 g | UC (2.4) | C (2.4) | C (2.3) | C (2.2) |
| 30 10/16/87 | 3645 1.0 g | PCA3815 Gold (3:1) 1.0 g | UC (2.5) | C (2.5) | C (2.4) | C (2.3) |
| 31 10/16/87 | 3645 1.0 g | PCA4815 Gold (4:1) 1.0 g | UC (1.9) | C (1.9) | C (1.9) | C (1.8) |
| 32 10/16/87 | 3645 1.0 g | PCA35R Orange 5R (3:1) | UC (2.0) | C (1.8) | C (2.1) | C (2.0) |

TABLE II-continued

Coloring of Aluminum Paste

| DATE MADE | PASTE | COLORING | N-PROPANOL | RINSE WITH PROPANOL | MINERAL SPIRIT | RINSE WITH BUTANOL |
|---|---|---|---|---|---|---|
| 33 10/16/87 | 3645 1.0 g | 1.2 g PCA45R Orange 5R (4:1) 1.0 g | UC (2.0) | C (1.7) | C (1.9) | C (1.8) |
| 34 10/19/87 | 3000 1.0 g | 1.2 g PCA1815 Gold (1:1) 1.0 g | C (5.2) | C (5.6) | C (4.2) | C (4.0) |
| 35 10/19/87 | 3000 1.0 g | PCA2815 Gold (2:1) 1.0 g | PC (5.4) | C (6.5) | C (6.0) | C (6.0) |
| 36 10/19/87 | 3000 1.0 g | PCA3815 Gold (3:1) 1.0 g | PC (5.6) | C (6.3) | C (5.9) | C (5.4) |

The colorants which can be used generally are any inorganic or organic pigments. Pigments which have been successfully employed include titanium dioxide, Sun Chemical Co. Sunfast Blue, American Hoechst Hostaperm Red, Chemical Co. Sunfast Green, Ciba-Geigy Irgazin Orange 5R, Ciba-Geigy Monastral Gold YT-915-D and Ciba-Geigy Monastral Gold YT-815-D.

EXAMPLE 6

The most consistent results, and the best color value and irreversibility of coloring was obtained for the ES2-3 series of PEL with isopropanol as the coloring intermediate solvent. In all cases the results indicate that water was a factor for controlling the color values on the aluminum pigment even when the supernatant of the coloring solvent was clear. This observation suggests that the concentration of water in isopropanol affects the stability of the PEL dispersions, where limited flocculation of PEL particles results in a loss of color value.

Observation of a large number of coloring experiments has shown that a clear supernatant in the coloring step does not always result in significant coloring of the aluminum pigment. The interpretation of these data indicate that the mechanism for coloring is strongly dependent upon the stability of the Dye Encapsulated Latex-Pigment Encapsulated Latex, DELPEL particles because flocculation of the PEL particles results in a clear supernatant and a loss of color value on the aluminum flakes. The stability of the DELPEL dispersions was, therefore, evaluated in n-propanol under different conditions and the results are summarized in Table III-1 through Table III-9. The first column in Table III identifies the grade and weight of the aluminum paste which was sedimented from 10 cc of the supernatant solvent, and the second column identifies the type and weight of the PEL dispersions added to the supernatant. The third and fourth columns in Table III-1 and Table III-2 give the stability results in the indicated solvents. The fifth column in Table III-1 and III-2 indicate whether or not the PEL particles would redisperse after sedimentation, which is an indication of the degree of stability of the particles. The third, fourth, and fifth columns in Tables III-3 and III-9 give the stability results for the indicated different concentrations of water added to the n-propanol The stability results are expressed with the following notation: S-stable, PS-partly stable, SS-slightly stable and US-unstable.

The concentration of the colorant can be varied from as little as 1% to as much as 99% based upon metal loading. Concentration averages in the range of from 10% to 30% colorant to 90% to 70% aluminum pigment have proved most satisfactory.

The interpretation of these data may be summarized as follows. All of the PEL particles appear to be more stable in n-propanol when water is present in the solvent. This appears to be due to the fact that polymer particles in general tend to undergo a change in charge as a function of concentration in the lower alcohols. This transition always results in a region of instability due to low surface charge. The orange samples led to adequate coloring of the aluminum over a wide range of water concentration in propanol while the gold encapsulated PEL was found to require higher concentrations of water and in addition required a surfactant, i.e., sodium laurylsulphate. There is also an indication that the gold dispersion was undergoing a change in surface properties with time as evidenced by an increase in instability with aging time of the PEL dispersions. This instability leads to a loss in color value of the colored aluminum pigment possibly due to flocculation of the PEL particles on the surface of the aluminum flakes.

The PEL dispersion stability and coloring results indicated that the degree of interaction of the 3AXL27 PEL particles with the aluminum flakes in dispersed n-propanol is a function of the concentration of water in the propanol. The water concentration, furthermore, has potential of affecting the surface charge of the PEL particles and aluminum flakes. The electrophoretic mobility of Sparkle Silver 3000 AR and Tufflake 3645 Aluminum Pastes was measured in propanol as a function of water concentration in the range of 0% to 15%. The results show that the gold and orange samples are different and that both aluminum paste samples are negative at 0% water and are positive at 10% water. The different stability results for the Sparkle Silver 3000 AR and Tufflake 3645 Aluminum Pastes indicate that different grades of aluminum paste can exhibit different surface properties.

The mechanism proposed for the coloring of aluminum flakes is to generate a common condition for both the aluminum particles and PEL particles which results in stability of like particles, i.e., aluminum with aluminum and PEL with PEL, and instability with respect to unlike particles, i.e., PEL with aluminum particles. The different degrees of stability are proposed as being controlled by the surface charge of the PEL and aluminum pigment particles.

Coloring, therefore, can be expected to take place when the aluminum and PEL particles are oppositely charged or one of the particles, preferably the PEL particle, has at least a low charge. The parameters which appear to control the charge are the concentration and grade of the aluminum paste and the concentration of water in propanol. Experiments were carried out to investigate the electrophoretic mobility and stability of PEL dispersions in the supernatant obtained from different concentrations and grades of aluminum flakes in order to define the conditions present during coloring. These results were consistent with the results obtained from the coloring experiments. The objective of this line or research was to evaluate the conditions from maximum interaction of the PEL colorant with the aluminum flakes, and the relationship between these conditions and the reversibility of the coloring process.

The major experimental effort was carried out with earlier formulations of PEL dispersions which generally were effective for coloring the Sparkle Silver 3000 AR and Tufflake 3645 Aluminum Paste grades but which showed some problems with respect to shelf life and irreversible coloring in different solvents. The more recent ES2-3 PEL formulation shows improvements in all respects including coloring characteristics with different color pigments. The indication, however, is that this PEL colors Tufflake 3645 Aluminum Paste more efficiently than the Sparkle Silver 3000 AR Aluminum Paste.

It has been found that other materials, such as mica, can be successfully colored by employing the above coloring techniques. 15.0 g of white mica,−325 mesh wet ground was dispersed in 45.0 g isopropanol and 50.0 g PEL and 0.03 g Epicure 874 were added. All components were slurried and then allowed to react. The colored material was collected and the results showed that the color was imparted on the mica flakes. Zinc flakes have also been colored using this same procedure. Solvent tests showed good solvent resistance to n-butanol, toluene, ethyl acetate and varsol. There was some color coming off in methyl ethyl ketone.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

TABLE III-1

Stability of 3AXL27 PEL in n-Propanol

| PASTE | COLORING | N-Propanol | N-Propanol-Oleic Acid | REDISPERSE |
|---|---|---|---|---|
| 3000 0.5 g | 3AXL27 Orange 0.5 g | S | | |
| 3645 0.5 g | 3AXL27 Orange 0.5 g | SS | | YES |
| 3000 0.1 g | 3AXL27 Orange 0.1 g | US | | NO |
| 3645 0.1 g | 3AXL27 Orange 0.1 g | US | | YES |
| 3000 0.1 g | 3AXL27 Orange 0.5 g | SS | | YES |

TABLE III-1-continued

Stability of 3AXL27 PEL in n-Propanol

| PASTE | COLORING | N-Propanol | N-Propanol-Oleic Acid | REDISPERSE |
|---|---|---|---|---|
| 3645 0.1 g | 3AXL27 Orange 0.4 DDI 0.1 Color | SS | | YES |
| 3645 0.5 g | 3AXL27 Orange 0.1 g | US | | NO |
| 3645 0.5 g | 3AXL27 Orange 0.25 g | US | | NO |
| 3645 0.5 g | 3AXL27 Orange 0.25 Color 0.75 DDI | S | | |
| 3645 0.5 g | 3AXL27 Orange 0.1 g | | 0.1% Oleic Acid US | NO |
| 3645 1.0 g | 3AXL27 Orange 0.1 g | US | | NO |
| 3645 1.0 g | 3AXL27 Orange 1.0 g | S | | |

TABLE III-2

Stability of 3AXL27 PEL in n-Propanol

| PASTE | COLORING | N-PROPANOL | N-PROPANOL-OLEIC ACID | RE-DISPERSE |
|---|---|---|---|---|
| 3645 0.1 g | 3AXL27 Orange 0.5 g | SS | | YES |
| 3645 0.5 g | 3AXL272XS Yellow 0.25 g | US | | YES |
| 3645 0.5 g | 3AXL272XS Yellow 0.25 Color 0.75 DDI | SS | | YES |
| 3645 1.0 g | 3AXL272XS Yellow 1.0 g | US | | YES |
| 3645 1.0 g | 3AXL272XS Yellow 0.25 g | US | | YES |
| 3645 0.5 g | 3AXL272XS Yellow 0.5 g | US | | YES |
| 3645 1.0 g | 3AXL272XS Yellow 0.25 Color 0.75 DDI | SS | | YES |
| 3000 0.5 g | 3AXL27 Orange 0.5 Color 0.5 DDI | | 0.1% Oleic Acid S | YES |
| 3645 0.5 g | 3AXL27 Orange 0.25 Color 0.75 DDI | | 0.1% Oleic Acid S | YES |
| 3000 0.5 g | 3AXL27 Orange 0.25 Color 0.75 DDI | | 0.1% Oleic Acid S | YES |
| 3645 0.5 g | 3AXL27 Orange 0.5 Color 0.5 DDI | | 0.1% Oleic Acid S | YES |

TABLE III-3

Stability of 3AXL27 PEL in Supernatant
From Paste 3000 in Propanol

| DATE | SAMPLE | 0% WATER | 10% WATER | 15% WATER |
|---|---|---|---|---|
| 10-28-87 | Gold (1:1) | US | US | US |
| 10-28-87 | Gold (2:1) | US | PS | S |
| 10-28-87 | Gold (3:1) | US | US | S |
| 10-28-87 | Gold (4:1) | S | S | S |
| 10-28-87 | Orange 5R (3:1) | S | S | S |
| 10-28-87 | Orange 5R (4:1) | S | S | S |

TABLE III-4

Stability of 3AXL27 PEL in Supernatant
From Paste 3645 in Propanol

| DATE | SAMPLE | 0% WATER | 10% WATER | 15% WATER |
|---|---|---|---|---|
| 10-28-87 | Gold (1:1) | PS | PS | US |
| 10-28-87 | Gold (2:1) | PS | PS | PS |
| 10-28-87 | Gold (3:1) | US | US | PS |
| 10-28-87 | Gold (4:1) | SS | S | S |
| 10-28-87 | Orange 5R (3:1) | S | S | S |
| 10-28-87 | Orange 5R (4:1) | S | S | S |

TABLE III-5

Stability of 3AXL27 PEL in n-Propanol
as a Function of Water Concentration

| DATE | SAMPLE | 0% WATER | 10% WATER | 15% WATER |
|---|---|---|---|---|
| 10-30-87 | Gold (1:1) | US | US | US |
| 10-30-87 | Gold (2:1) | US | US | US |
| 10-30-87 | Gold (3:1) | US | US | PS |
| 10-30-87 | Gold (4:1) | PS | S | S |
| 10-30-87 | Orange 5R (3:1) | S | S | S |
| 10-30-87 | Orange 5R (4:1) | S | S | S |

TABLE III-6

Stability of 3AXL27 PEL in 0.01% Aerosol A-103 in n-Propanol

| DATE | SAMPLE | 0% WATER | 10% WATER | 15% WATER |
|---|---|---|---|---|
| 11-09-87 | Gold (1:1) | US | US | S |
| 11-09-87 | Gold (2:1) | US | US | US |
| 11-09-87 | Gold (3:1) | US | US | US |
| 11-09-87 | Gold (4:1) | US | US | S |
| 11-09-87 | Orange 5R (4:1) | S | S | S |

TABLE III-7

Stability of 3AXL27 PEL in 0.1% Aerosol A-103 in n-Propanol

| DATE | SAMPLE | 0% WATER | 10% WATER | 15% WATER |
|---|---|---|---|---|
| 11-09-87 | Gold (1:1) | US | US | S |
| 11-09-87 | Gold (2:1) | US | US | PS |
| 11-09-87 | Gold (3:1) | US | US | PS |
| 11-09-87 | Gold (4:1) | US | US | S |
| 11-09-87 | Orange 5R (4:1) | S | S | S |

TABLE III-8

Stability of 3AXL27 PEL in n-Propanol

| DATE | SAMPLE | 0% WATER | 10% WATER | 15% WATER |
|---|---|---|---|---|
| 11-10-87 | Gold (3:1) 0.1% DAC | US | US | US |
| 11-10-87 | Gold (4:1) 0.1% DAC | US | US | PS |
| 11-10-87 | Gold (3:1) 0.1% SLS | US | US | US |
| 11-10-87 | Gold (4:1) 0.1% SLS | US | US | S |
| 11-10-87 | Gold (3:1) 0.05% SLS | US | US | US |
| 11-10-87 | Gold (4:1) 0.05% SLS | US | US | S |
| 11-10-87 | Gold (3:1) 0.2% SLS | US | US | US |
| 11-10-87 | Gold (4:1) 0.2% SLS | US | US | PS |
| 11-13-87 | Gold (3:1) Pure Propanol | US | US | US |
| 11-13-87 | Gold (3:1) 0.05% SLS | US | US | S |
| 11-13-87 | Gold (3:1) 0.1% SLS | US | US | S |

TABLE III-9

Stability of 3AXL27 PEL in n-Propanol

| DATE | SAMPLE | 0% WATER | 10% WATER | 15% WATER |
|---|---|---|---|---|
| 11-13-87 | Gold (3:1) 0.2% SLS | US | US | S |
| 11-13-87 | Orange 5R Pure Propanol | S | S | S |
| 11-13-87 | Orange 5R 0.05% SLS | S | S | S |
| 11-13-87 | Orange 5R 0.1% SLS | S | S | S |
| 11-13-87 | Orange 5R 0.2% SLS | S | S | S |

TABLE III-9-continued

Stability of 3AXL27 PEL in n-Propanol

| DATE | SAMPLE | 0% WATER | 10% WATER | 15% WATER |
|---|---|---|---|---|
| 11-13-87 | Formula 87-010-03 Pure Propanol | US | US | US |
| 11-13-87 | Formula 87-010-03 0.05% SLS | US | US | S |
| 11-13-87 | Formula 87-010-03 0.1% SLS | US | US | S |
| 11-13-87 | Orange 5R Pure Ethanol | S | S | S |
| 11-13-87 | Gold (3:1) Pure Ethanol | US | US | US |
| 11-13-87 | Gold (3:1) 0.1% SLS Ethanol | US | US | US |

What is claimed is:

1. A colored pigment for imparting color and metallic luster to a surface coating, comprising:
a plurality of metallic flakes or mica flakes wherein the metallic flakes are selected from the group consisting of aluminum, brass, bronze, gold and zinc, of a size sufficient to adhere 4–25% by weight polymer encapsulated pigments through coulombic interaction; and submicron-sized pigment particles encapsulated in a polymer matrix, the polymer being selected from the group consisting of vinyl acetal polymers, butyrals, bisphenol glycidyl ether type epoxy resin, rosin maleic copolymer resin, carboxyl functional acrylics, styrene/maleic anhydride copolymers and alkylated vinylpyrrolidone copolymers, the encapsulated pigment particles being adhered to and coloring the flakes, a plurality of encapsulated pigment particles being adhered to individual flakes, with the flakes not being continuously encapsulated by the polymer matrix.

2. The colored pigment of claim 1, wherein the flakes are metallic flakes.

3. The colored pigment of claim 1, wherein the flakes are aluminum.

4. The colored pigment of claim 1, wherein the colored pigment has a polymer matrix to pigment particles weight ratio of 1:9 to 9:1.

5. The colored pigment of claim 1, wherein the flakes are zinc.

6. The colored pigment of claim 1, wherein the flakes are selected from the group consisting of brass, bronze and gold.

7. The colored pigment of claim 1, wherein the flakes are mica.

8. The colored pigment of claim 1, which consists essentially of the flakes and the encapsulated pigment particles.

9. The colored pigment of claim 8, which consists of the flakes and the encapsulated pigment particles.

* * * * *